United States Patent

Aratani et al.

[11] Patent Number: 6,063,468
[45] Date of Patent: May 16, 2000

[54] OPTICAL RECORDING MEDIUM

[75] Inventors: Katsuhisa Aratani, Chiba; Toshiyuki Kashiwagi, Tokyo; Minoru Kikuchi, Miyagi, all of Japan

[73] Assignee: Sony Corporation, Tokyo, Japan

[21] Appl. No.: 09/066,159

[22] Filed: Apr. 24, 1998

[30] Foreign Application Priority Data

Apr. 25, 1997 [JP] Japan ..................................... 9-109660

[51] Int. Cl.$^7$ ....................................................... B32B 3/00
[52] U.S. Cl. ...................... 428/64.1; 428/64.2; 428/64.4; 428/688; 428/702; 428/913; 430/270.11; 430/945; 369/275.1; 369/283; 369/288
[58] Field of Search ................................ 428/64.1, 64.2, 428/64.4, 411.1, 688, 702, 913; 430/270.11, 495.1, 945; 369/275.1, 283, 280

[56] References Cited

U.S. PATENT DOCUMENTS 5,474,873 12/1995 Akamatsu ............................... 430/273
5,510,164 4/1996 Best ....................................... 428/64.1
5,654,046 8/1997 Ninomiya ................................. 428/1

*Primary Examiner*—Elizabeth Evans
*Attorney, Agent, or Firm*—Frommer Lawrence & Haug, LLP.; William S. Frommer

[57] ABSTRACT

An improved optical recording medium is provided, and includes a surface of the optical recording medium having at least pits and grooves formed therein, a recording layer formed adjacent the surface of said optical recording medium, and a light transmissive layer formed adjacent the recording layer. Information is recorded and/or reproduced by irradiation of light from an optical pickup employing an objective lens having a numerical aperture of 0.7 or larger through the light transmission layer. At least a surface layer of said light transmissive layer is formed of a material having a Young's modulus of 70 GPa or larger thereby greatly reducing or eliminating scratches from the surface of the optical recording medium while allowing for an increase in the storage capacity of the optical storage medium.

14 Claims, 2 Drawing Sheets

OPTICAL RECORDING MEDIUM

BACKGROUND OF THE INVENTION

This invention relates generally to an optical recording medium and more particularly to an optical recording medium having a reduced thickness and an increased hardness in order to improve the information storage density thereof, and to defend against damage resulting from contact with an optical lens or the like. Most recently, optical recording media have become very important in the recording medium industry, and therefore various studies and much research concerning optical information recording systems for recording information on, and retrieving information from, optical recording media have taken place. An optical information recording system has various advantages, including information being recorded and reproduced without contact between the optical reading/recording head and the recording medium, a higher recording density being achieved as compared with magnetic recording medium, and the optical information recording system being applied to a system allowing for read only optical recording medium, a write once read many (WORM) optical recording medium, or a rewritable optical recording medium. Thus, an optical information recording system utilizing optical recording media having a large capacity allows for the recording and storage of a large amount of information at an inexpensive cost, and is therefore useful in various fields including various industrial applications and commercial uses.

Read only memory type optical recording media are quite common, and include digital audio compact discs (CDs), optical video discs, DVDs, CD-ROM computer discs and the like. A conventional optical disc 300 such as a CD, optical video disc, DVD, CD-ROM or the like is shown in FIG. 3, and is formed with one main surface of a disc substrate 310 including concave and convex patterns 315 which comprise pits and grooves, or the like, for recording information. This pattern of pits and grooves represents an information signal. A reflective film 311 comprising a metal thin film such as an aluminum film or the like is formed as a recording layer on the main surface of disc substrate 310 having the patterns formed therein. Further, a protective film 312 for protecting the reflective metal film from water and oxygen in the air is formed adjacent the reflective metal film. This protective film is usually formed of a polycarbonate or U.V. curable resin. Information is retrieved from optical disc 300 by irradiation of a reading light beam 316 which is focused through an objective lens L. The light is reflected from recording film 311 in accordance with the information recorded as pits and grooves.

Light transmissive layer 312 is formed of a transparent material, and recording film 311 may be formed of a plurality of layers, including a transparent dielectric film of silicone nitride or the like positioned at the lower surface of light transmissive layer 312, a magneto-optical recording film formed of TbFeCo or the like formed as an information recording layer positioned adjacent the first layer of silicone nitride, and a second transparent dielectric film formed of silicone nitride positioned adjacent the film of TbFeCo, to form a type of layer sandwich. Reflective film 311 is positioned between the second transparent dielectric film of recording film 311 and recording medium substrate 310.

A rewritable magneto-optical disc may be similarly formed with the same general structure, and includes a recording layer formed of a transparent dielectric film, comprising silicone nitride or the like, a magneto-optical recording film, comprising TbFeCo or the like positioned adjacent the transparent dielectric film, and a further transparent dielectric film, comprising silicone nitride or the like, formed adjacent the magneto-optical recording film, thus sandwiching the magneto-optical recording film between two layers of transparent dielectric film. A reflective film, comprising an aluminum film or the like, is then formed between the recording layer and the disc substrate.

In an attempt to increase the recording density of an optical disc, magneto-optical disc or the like, it has been proposed that the numerical aperture of the objective lens used for reading information from or writing information to the disc be increased. This proposed increase in the numerical aperture of the objective lens would reduce the diameter of the spot reproduction light, and therefore recording and reproduction using this reduced diameter spot recording light would take place with a higher recording density. However, if the numerical aperture of the objective lens is increased, it is consequently necessary to decrease the thickness of the light transmissive layer (or protective layer) through which the irradiated reproduction spot light is transmitted. This is because as the numerical aperture of the optical pickup increases, the allowable skew angle at which the disc surface may be displaced relative to the coaxial axis of the optical pickup is reduced. This skew angle is proportional to the square of the product of an inverse number of the wavelength of light from a light source, and the numerical aperture of the objective lens. Accordingly, in order to guarantee the required reduction of the skew angle, the thickness of the light transmitting layer must be reduced.

In order to achieve this reduced thickness of the light transmissive layer, there has been proposed in the prior art an optical recording medium having a recording layer formed of concave and convex pits or grooves on one main surface of a disc substrate, a reflective layer provided adjacent the recording layer, and a light transmissive layer comprising a thin film formed adjacent the reflective layer. A reproduction light is irradiated on the disc, and is transmitted through the light transmissive layer to reproduce information recorded as pits and grooves on the recording layer. The formation of the optical medium in this manner allows for a decrease in the thickness of the light transmissive layer, and also enables an increase in the numerical aperture of the objective lens, as described above. Most commonly, the light transmissive layer is formed of an ultraviolet curing resin, such as an acrylic polymer material or the like.

However, if the numerical aperture of the objective lens of the optical pickup is increased, as proposed above, the working distance of the objective lens (the distance between the objective lens and the optical recording medium) must consequently be reduced. If this working distance is not reduced, and a working distance similar to that of a conventional objective lens is used, the objective lens must be very large and heavy, and as a result, the access time for reproducing information from the optical recording medium is slow and the tracking servo and focus servo are less exact. It has therefore been proposed to reduce the weight of the objective lens by bringing the objective lens closer to the optical recording medium, thereby shortening the working distance therebetween.

However, when this working distance is reduced, it is thereafter possible that the optical pickup lens will sporadically come into contact and collide with the optical recording medium. The transparent disc substrate and light transmissive layer are generally formed of plastic such as a polycarbonate, UV curable resin, or the like, because plastic is inexpensive and permits guide grooves to be easily formed therein, and also permits other pits and grooves for recording information to be easily formed therein by ejection molding. Therefore, when the optical pickup collides with the optical recording medium, it is possible that the optical recording medium will be broken. Additionally, if the objective lens of the optical pickup collides with the optical recording medium, the light transmissive layer may be easily scratched or deformed, since the plastic (such as polycarbonate, UV curable resin, or the like) which forms a transparent disc substrate or light transmissive layer is a very soft material as compared with the glass forming the objective lens. Therefore, the objective lens may crack the transparent disc substrate, or scratch the surface of the light transmissive layer. Since information is reproduced from the recording medium via the irradiation of light, any scratches in the surface thereof may disrupt the light path, and therefore reduce the effectiveness of the reproduction of the information from the optical recording medium.

Furthermore, a holder for holding the objective lens is typically formed of a plastic material. The distance between the holder and the optical recording medium is typically smaller than the distance between the objective lens and the optical recording medium, since the holder must secure the lens therein. Thus, in this configuration, the holder might collide with the optical recording medium. It is possible that the plastic of the holder for the objective lens may scratch the recording medium, if the plastic forming the objective lens holder is harder than the plastic forming the optical recording medium. However, if the holder is formed of a material that is softer than the material forming the optical recording medium, it is possible that the holder will be deformed, thereby disrupting the positioning of the objective lens.

Additionally, if any dust is positioned within the space between the holder and the recording medium, upon contact between the holder and the optical recording medium, the holder may cause this dust to scratch and/or break the transparent disc substrate or light transmissive layer of the recording medium. As noted above, since the information is retrieved from an optical recording medium via irradiation of light, any such scratches thereon may cause disc read errors. While errors in the radial direction may be small enough to be able to be corrected through an error correction process, scratches in the track direction are likely to be longer, including a longer error length, and may be more difficult to correct using error correcting techniques. Additionally, these scratches may effect the tracking or focus servo signal, thereby disabling servo control, and lowering the reliability of the reproduction of data from the optical recording medium.

Finally, any dust which may be adhered to the light transmissive layer of the optical recording medium by static electricity may make the reproduction of data therefrom difficult, may increase the error rate during a read operation, and may therefore reduce reliability of reproduction of information therefrom.

Therefore, it would be beneficial to provide an improved optical recording medium which overcomes the drawbacks of the prior art.

OBJECTS OF THE INVENTION

Accordingly, it is an object of the invention to provide an improved optical recording medium in which the thickness of the light transmissive layer thereof is reduced in order to allow for a corresponding increase in the numerical aperture of the objective lens of the optical pickup, while decreasing the working distance between the optical pickup and optical recording medium.

Another object of the invention is to provide an improved optical recording medium which comprises a light transmissive layer which is not easily scratched or broken, but which does not affect the reproduction characteristics of the optical recording medium.

A further object of the invention is to provide an improved optical recording medium in which the rigidity, thickness, and reflective index of the material forming the transparent layer is specifically chosen to allow for sufficient strength and resilience of the recording medium, without detrimentally affecting the ability to reproduce information therefrom.

Still another object of the invention is to provide an improved optical recording medium in which the light transmissive layer is formed with a surface having a sufficient hardness to reduce scratching thereof, and giving the optical recording medium sufficient strength to reduce breakage thereof.

Yet another object of the invention is to provide an improved optical recording medium in which the material forming the light transmissive layer reduces static electricity thus reducing the amount of dust or the like adhered thereto.

Still other objects and advantages of the invention will in part be obvious and will in part be apparent from the specification and the drawings.

SUMMARY OF THE INVENTION

Generally speaking, in accordance with the invention, an improved optical recording medium is provided with a light transmissive layer having at least a surface portion thereof formed of a material with a Young's modulus of 70 GPa or larger and preferably 150 GPa or larger, and which gives the optical recording medium an overall strength of a pencil hardness of at least "H". This light transmissive layer, and surface thereof is formed on the side of an optical recording medium at which light is irradiated from an objective lens in order to read information therefrom. A narrow working distance is provided between the objective lens having a numerical aperture of 0.7 or larger and the light transmissive layer. Because of the strength of the material used to form at least the surface layer of the light transmissive layer, even if the optical objective lens accidentally comes into contact with the optical recording medium, the surface of the light transmissive layer of the recording medium can be prevented from being scratched, and the optical recording medium can be prevented from being broken, or cracked from this contact with the objective lens. Thus, the reliability of reproduction of information from the optical recording medium can be improved. Additionally, if the recording medium of the invention is applied to a magneto-optical disc, any scratches which might ordinarily result from the contact of a fiber for reading the magnetic portion of the disc that is brought into contact with the surface of the light transmissive layer will be greatly reduced or eliminated. The light transmissive layer will remain essentially scratch free, and the optical recording medium will not be damaged, thus improving the reliability of the reproduction of information therefrom.

According to the invention, since the light transmissive layer may be formed of two layers of material, a second layer positioned adjacent the recording layer of the optical recording medium and a first layer provided at the surface of the optical recording medium light transmissive layer adjacent the second layer, it is possible to further increase the hardness of the surface of the optical recording medium and the overall hardness of the optical recording medium, and to more easily form the light transmissive layer. Thus, even if a thin optical recording medium is utilized, by selection of the material of the first layer of the light transmissive layer at the surface of the recording medium having a Young's modulus of 70 GPa or more, and preferably 150 GPa or more, and also resulting in a pencil hardness of H or harder for the optical recording medium, it is possible to reduce or eliminate scratches on the surface of the recording medium or the possibility of damaging the optical recording medium, and therefore provide a large storage capacity having a reliable reproduction capability.

Additionally, in accordance with the invention, the thickness of the light transmissive layer is set at approximately 150 µm or less, and therefore the numerical aperture of the objective lens of the optical pickup can be increased a sufficient amount as required.

Furthermore, in accordance with the invention, it is possible to select the material for the light transmissive layer so that the surface of the optical recording medium has an increased conductivity, thus reducing static electricity retained thereby. Therefore dust and the like are not attracted thereto, thereby increasing the reliability of the reproduction of information therefrom.

The invention accordingly comprises the features of construction, combinations of elements and arrangement of parts which will be exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

It has been determined that by increasing the hardness of a surface of a light transmissive layer of an optical recording medium, it is possible to greatly reduce or eliminate scratches or damage to the optical recording medium and to therefore secure the reliability of reproduction of information therefrom, even if the recording medium collides with the optical pickup, holder, dust or the like. Specifically, in order to provide a light transmissive layer with sufficient hardness, a material having a Young's modulus of 70 GPa or greater on the surface thereof should be used, and it is preferable to utilize a material having a Young's modulus of 150 GPa or greater. The Young's modulus of a material measures the elastic modulus of material in a bulk state, and has a close relationship with hardness of material. Thus, Young's modulus is utilized here to indicate an index of surface hardness and accordingly is related to scratches of the optical recording medium. However, since light is irradiated through the light transmissive layer in order to reproduce information from the recording film and grooves formed therein, any alteration in the optical properties of the light transmissive layer has a profound effect on the optical characteristics of the optical recording and reproduction system. Therefore, simply choosing a material with an increased Young's modulus is not possible, and other characteristics of the system must be considered.

Thus, it has been determined that the light transmissive layer should be provided with a thickness of approximately 150 µm or less, and the light transmissive layer may be formed of a material containing at least one of $C_{100-x}H_x$ (1 (atom %)<X <45 (atom %)), $Si_3N_4$, $MgF_2$, $Al_2O_3$, and $SiO_2$, and having a Young's modulus of 70 GPa or greater, and preferably having a Young's modulus of 150 GPa or greater, as noted above. The use of this thin light transmissive layer allows for the increase in the numerical aperture of the objective lens of the optical pickup.

Further in accordance with the invention, even if the optical disc is in part formed of a recording magnetic material, and a magnetic fiber pickup is passed thereover, this fiber will not scratch the outer surface of the optical portion of the recording medium because of its increased hardness, thereby improving the reliability of subsequent data retrieval therefrom. The fiber may be a non-woven fabric formed of rayon polyester polypropylene nylon or the like, and a lubricant material may be coated on the surface of the light transmissive layer of the optical portion of the recording medium or on the surface of the non-woven fabric in order to further aid in the prevention of abrasion of the optical recording disc.

Figure 4:
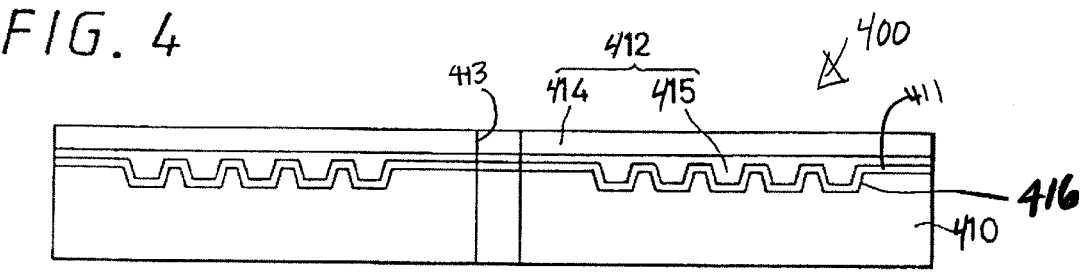
FIG. 4 is a cross-sectional view of an optical recording medium constructed in accordance with the invention.

Reference is made to FIG. 4 which depicts an optical recording medium 400 constructed in accordance with a preferred embodiment of the invention. A substrate 410 is formed with a plurality of pits and grooves 415. A recording film 411 is positioned adjacent substrate 410 and conforms to the shape of the grooves and pits 416. A light transmissive layer 412 is formed adjacent recording film 411. Recording medium 400 is further formed as a disc with a center aperture 413. Light transmissive layer 412 preferably is formed of a first, or surface, layer 414, and a second layer 415, each layer being formed of a different material. The provision of light transmissive layer 412 formed of two layers of different materials allows for the use of a harder material for surface layer 414, while a softer material, which may have more beneficial optical qualities and which may be less expensive to use and easier to handle, may be used to form the second, or internal, layer 415, which is in contact with recording film 411. It has been determined that when two layers of different material are used to form light transmissive layer 412, it is preferable to form layer 414 of a material having a Young's modulus of at least 70 GPa, and most preferable to use a material having a Young's modulus of 150 GPa or greater, in order to assure sufficient hardness, and to form layer 414 with a thickness of between 2 and 230 nm. If the thickness of layer 414 is not greater than 2 nm, this layer will not provide sufficient strength to the recording medium. If, on the other hand, layer 414 is thicker than 230 nm, the surface reflection may become too large, and therefore be detrimental to the information reproduction process.

In order to determine the optimum parameters for the hardness, and thickness of the light transmissive layers in accordance with the invention, the inventors have performed a number of studies to determine appropriate ranges for each of the variables.

EXAMPLE 1

In this example, the relationship between the Young's modulus of material forming the surface of the light transmissive layer and the occurrence of scratches thereon was determined. The following optical recording media were prepared for testing. A first optical recording medium was prepared having a light transmissive layer formed of a polycarbonate with a thickness of 100 µm, which was applied by sputtering. A second optical recording medium was prepared having a light transmissive layer formed of an ultraviolet curing resin with a thickness of 100 µm which was applied by sputtering. A third group of optical recording media were prepared in which the light transmissive layer was formed of a second layer 415 formed of an ultraviolet curing resin applied by sputtering and a first, surface layer 414 with a thickness of 50 nm. One recording medium from this third group was formed having first layer 414 formed of an amorphous carbon hydride (CH) film applied by chemical vapor deposition. Four additional optical recording media in this third group were prepared by sputtering, each having first layer 414 formed respectively of $SiO_2$, $MgF_2$, $Al_2O_3$ and $Si_3N_4$.

The chart shown below in Table 1 indicates the Young's modulus of the first layer 414 and, when organic materials are used to form a single layer, the pencil hardness of the optical recording medium. The degree of scratches was ascertained when the optical recording medium was rotated at a speed of 1800 rpm for one minute while a polyester fiber was pressed thereon with a pressure of 0.2 (g/cm$_2$). The scratches were measured at a position 40 nm from the center of the recording medium in the radial direction. Pencil hardness is a measure of the overall strength of the optical recording medium, and is therefore generally related to breakage of the optical recording medium, but is also indicative of the degree of scratch resistance of the surface of the optical recording medium. The pencil hardness of many of the materials is not shown, since for these inorganic materials, this value would be extremely high, and thus is not shown.

TABLE 1

| material for first layer | thickness of first layer | Young's modulus of a first layer material | pencil hardness of first layer material | material for second layer | degree of scratch |
|---|---|---|---|---|---|
| polycarbonate | 100 µm | 2 GPa | B | polycarbonate | extremely many |
| ultraviolet curing resin | 100 µm | >2 GPa | 2H | ultraviolet curing resin | many |
| $SiO_2$ | 50 nm | 70 GPa | | ultraviolet curing resin | slight |
| $MgF_2$ | 50 nm | 110 GPa | | ultraviolet curing resin | few |
| $Al_2O_3$ | 50 nm | 345 GPa | | ultraviolet curing resin | none |
| $Si_3N_4$ | 50 nm | 390 GPa | | ultraviolet curing resin | none |
| CH | 50 nm | 150 GPa | | ultraviolet curing resin | none |

As is shown in Table 1, a large number of scratches occur when the light transmissive layer which comprises the surface of the recording medium is formed of a soft material such as polycarbonate or ultraviolet curing resin. It is also seen from Table 1 that as the hardness of the first, surface layer 414 of the optical recording medium is increased, the occurrence of scratches formed thereon by the polyester fiber is reduced.

The use of a material to form the surface layer 414 of the optical recording medium having a Young's modulus of greater than or equal to 70 GPa results in a greatly reduced number of scratches thereon. Furthermore, no scratches occur on the material having a Young's modulus of 150 GPa or larger. Thus, it has been determined that use of a material to form the surface layer 414 of the two-layer light transmissive layer, having a Young's modulus of 70 GPa or greater aids in reducing the occurrence of scratches on the surface of the optical recording medium, and a layer having a Young's modulus of 150 GPa or greater nearly eliminates the occurrence of scratches on the surface of the optical recording medium, thereby improving the strength of the optical recording medium, and thus also the reliability of the reproduction of information therefrom. By forming the first layer (414) of the light transmissive layer (412) of at least one of $C_{100-x}H_x$ (1 (atom %)<X<45 (atom %)), $Si_3N_4$, $MgF_2Al_2O_3$, and $SiO_2$, the hardness of the surface of the light transmissive layer is easily improved, thereby reducing scratches, and in turn improving the reproduction of information from the recording medium.

EXAMPLE 2

In Example 2, the relationship between the thickness of first layer 414 of light transmissive layer 412 and the occurrence of scratches on the surface thereof was surveyed. Optical recording media having a diameter of 60 nm and having a second layer 415 formed of an ultraviolet curing resin were prepared. A first group of the recording media were formed with a first layer 414 formed of $SiO_2$, deposited, by sputtering, having thicknesses of 1 nm, 2 nm, 10 nm, 50 nm and 200 nm, respectively. A second group of optical recording media were formed with first layer 414 formed of $Si_3N_4$, deposited by sputtering, having thicknesses of 1 nm, 2 nm, 10 nm, and 50 nm, respectively. Table 2 below shows the results of the test performance, indicating the degree of scratches formed on particular recording media.

TABLE 2

| material forming first layer | thickness of first layer | material forming second layer | degree of scratch |
|---|---|---|---|
| $SiO_2$ | 1 nm | ultra violet curing resin | many |
| $SiO_2$ | 2 nm | ultraviolet curing resin | many |
| $SiO_2$ | 10 nm | ultraviolet curing resin | many |
| $SiO_2$ | 50 nm | ultraviolet curing resin | slight |
| $SiO_2$ | 200 nm | ultraviolet curing resin | none |
| $Si_3N_4$ | 1 nm | ultraviolet curing resin | many |
| $Si_3N_4$ | 2 nm | ultraviolet curing resin | slight |
| $Si_3N_4$ | 10 nm | ultraviolet curing resin | few |
| $Si_3N_4$ | 50 nm | ultraviolet curing resin | none |

As is shown in Table 2, regardless of the kind of material used to form first layer 414, as the thickness of first layer 414 increases, the number of scratches thereon decreases. When first layer 414 is formed of $Si_3N_4$, the occurrence of scratches can be greatly suppressed even if the thickness of first layer 414 is 2 nm. Therefore, by increasing the thickness of first layer 414, the occurrence of scratches can be reduced.

While it may seem beneficial to provide first layer 414 with the greatest thickness possible to reduce or eliminate scratching completely, an upper limit of the thickness of the first layer exists in that as the thickness of first layer 414 is increased, the optical properties of the system change. Since first layer 414 and second layer 415 each form a portion of the light transmissive layer 412, each having different refractories, light reflected at the boundary between air and first layer 414, and light reflected at the boundary between first layer 414 and second layer 415 interfere with each other, so that the amount of light reaching the recording layer is reduced. Furthermore, as the thickness of the first layer increases, the amount of reflectivity increases, and therefore the amount of light reaching the recording layer is greatly reduced. Thus, the reproduction signal is more faint, and the power required to overcome this reflection would be too great.

Reflectivity Examples

Figure 1:
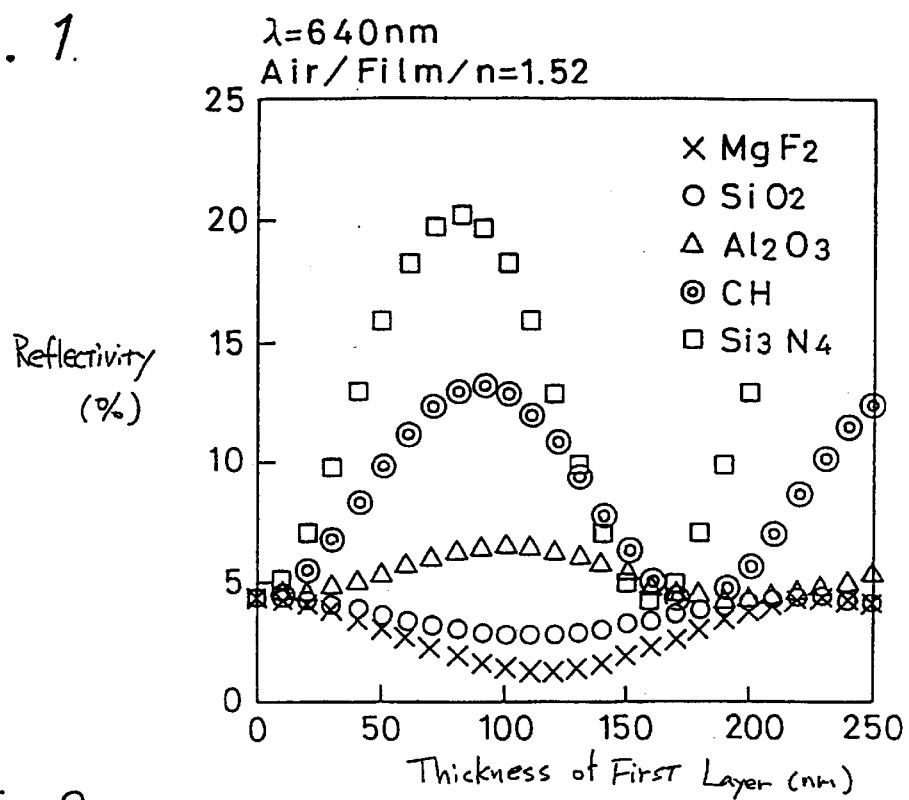
FIG. 1 is a graph depicting the results of measurements of the change of reflectivity from a light transmissive layer having a refractivity index of 1.52 relative to air of light having a wavelength of 640 nm when the thickness of a first layer of the light transmissive layer is changed for different materials.

Reference is next made to FIG. 1 which depicts the calculated reflectivity of an irradiated light beam having a wavelength of 640 nm from an optical recording medium. Second layer 415 of light transmissive layer 412 is formed of a UV resin without fluoride and having an index of refraction relative to the air fixed at a value of 1.52. Various materials were tested, including $MgF_2$, $FiO_2$, $Al_2O$, CH and $Si_3N_4$ having refractivities of 1.38, 1.46, 1.60, 1.80 and 2.00, respectively. In FIG. 1, the X axis indicates the thickness of first layer 414, while the Y axis indicates the reflectivity thereof.

Figure 2:
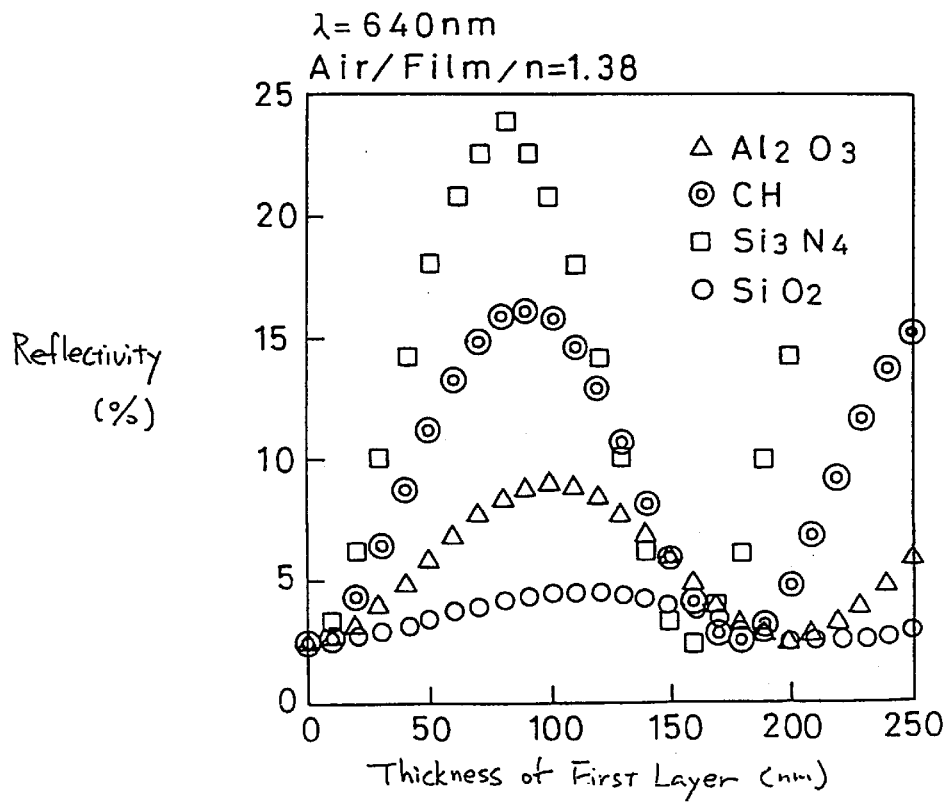
FIG. 2 is a graph depicting the results of measurements of the change of reflectivity from a light transmissive layer having a refractivity index of 1.38 relative to air of light having a wavelength of 640 nm when the thickness of a first layer of the light transmissive layer is changed for different materials.
Figure 3:
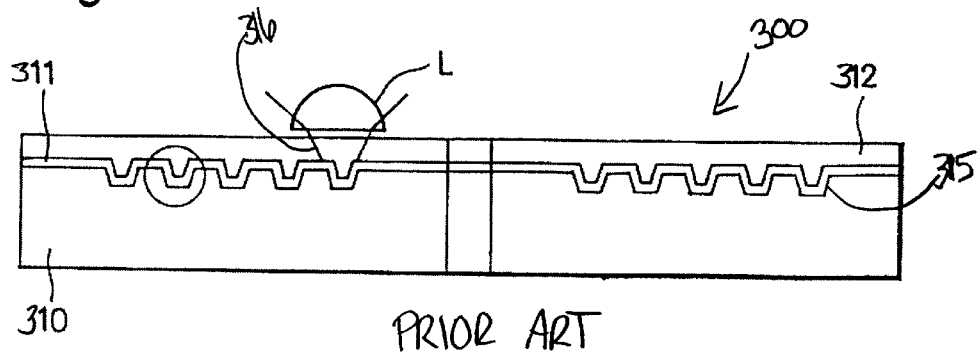
FIG. 3 is a cross-sectional view of a prior art optical recording medium.

FIG. 2 depicts a similar graph, using similar materials to form first layer 414, but wherein the second layer 415 of light transmissive layer 412 is formed of a UV resin with fluoride, and thus having an index of refraction relative to air fixed at a value of 1.38, rather than 1.52 shown in FIG. 1.

The reflectivity of an ordinary polycarbonate transparent substrate used in the prior art is approximately 5%. Thus, the reproduction signal level becomes 95%×95%=90% due to surface reflection and the fact that the light beam passes over the barrier with the 95% reflectivity twice. Thus, any material resulting in a reflectivity greater than 10% performs worse than the material of the prior art.

As is shown in FIGS. 1 and 2, only CH and $Si_3N_4$ have reflectivities greater than 10%, regardless of thickness. As noted above, each of these two materials have the highest refractivities, 1.80 and 2.00 respectively. Therefore, in accordance with the study of FIGS. 1 and 2, in order to provide a material for first layer 414 to have a reflectivity less than that of the prior art, as is shown in FIGS. 1 and 2, the refractivity of the material must be less than 1.65, or, if the refractivity of the first layer exceeds 1.65, the thickness of first layer 414 must be less than or equal to 30 nm, or from between 130 to 190 nm. It can also be seen from both FIGS. 1 and 2 that an upper limit in the thickness layer of 230 nm should be provided, since above this level the surface reflectivity graphs continue to rise upward, and therefore would provide a reflectivity greater than that of the prior art. Additionally, if the thickness approaches the upper thickness limit, fluctuations in the thickness of the layer may cause the thickness thereof to go above the critical upper limit. Therefore, it is determined that the thickness of any first layer 414 should not be greater than 230 nm.

Increased Storage Capacity Design

In accordance with the studies noted above in Tables 1 and 2 and FIGS. 1 and 2, an optical recording medium constructed in accordance with the invention having a storage capacity of 8 gigabytes of information or larger to which the present invention is applied will now be described.

A digital versatile disc (DVD) which is currently known in the art has a storage capacity of 4.7 gigabytes when the wavelength λ of the irradiated light beam is 650 nm and the numerical aperture of the lens of the optical pickup is 0.6. In order to gain a larger storage capacity, i.e. 8 gigabytes, without changing the signal format, error correction code, modulation system or the like, equation 1, noted below, must be met.

$$4.7 \times (0.65/0.60 \times N.A./\lambda)^2 \geq 8 \quad (1)$$

In equation 1, 4.7 is the current storage capacity, 0.65 is the current wavelength of the irradiated light beam in micrometers; 0.60 is the current numerical aperture of the objective lens, N.A. represents the new required numerical aperture for the increased storage system, and λ represents the wavelength of the irradiated light beam for the new increased storage capacity system in micrometers. Thus, upon solving equation 1, it is determined that the numerical aperture divided by the wavelength in μm must be greater than or equal to 1.20. (The wavelength λ noted above of 650 nm equals 0.65 μm). Thus, if as noted above λ in the improved storage system equals 0.65 μm, which is the same as in the conventional system so that this portion of the equipment need not be changed from that used currently in the art, the numerical aperture must be greater than or equal to 0.78 in order to provide the desired storage capacity. The use of an irradiated light beam with a smaller wavelength, such as a blue laser having a wavelength of approximately 400 nm will further increase the storage capacity, or alternatively allow an objective lens with a reduced numerical aperture to be used.

If a skew margin is represented by θ and the thickness of the light transmissive layer of the disc is represented by t, the following equation 2 is established $$\theta \leq \pm 84.115(\lambda/N.A.^3/t) \quad (2)$$

In a standard DVD, θ=0.4° and if the wavelength of laser light is λ=0.4 μm, this will allow the use of the existing red laser at 650 nm (which is larger and thus would allow for a less restrictive thickness) or the use of a future blue laser at 400 nm, which has a shorter wavelength and also requires a smaller θ. The thickness t of the light transmissive layer must be less than or equal to 177 μm in order to provide the desired storage capacity. Thus, the upper limit of the value of the thickness of the light transmissive layer is 177 μm, and a lower limit is preferably approximately 3 μm, as noted above, in order to provide sufficient strength to the optical recording medium.

Because of the requirements for the thickness of the light transmissive layer, the consistency of the thickness of the light transmissive layer must be improved. An aberration resulting from the influence of an uneven thickness at a spot of the light transmission layer is proportional to a biquadrate of the value of the numerical aperture and the wavelength. Accordingly, if it is desired to increase the recording density by increasing the numerical aperture and reducing the wavelength of the irradiated light beam, then the uneven thickness of the light transmissive layer should be within more strict limits. A conventional CD utilizes a numerical aperture of 0.45, the standard tolerance for the thickness of the light transmissive layer may be ±100 μm. By using this currently acceptable unevenness as a reference, the change in thickness must be in the range of $$\Delta t = \pm (0.45/N.A.)^4 \times (\lambda/0.78) \times 100 \quad (5)$$

$$= \pm 5.26 \times (\lambda/N.A.)^4 \; \mu m$$

(where N.A. represents the numerical aperture)

In accordance with alternative embodiments of the invention the first, surface layer may be formed of other materials. The inventors have determined that if first, surface layer 414 is formed of SiN, by sputtering, the optimal thickness is approximately 100 nm. This thickness is determined similarly to the determination of thickness in the first-described embodiment. Indeed, any suitable material may be used to form the first, surface layer of the light transmissive layer, as long as this material has a Young's modulus of greater than 70 GPa, and preferably greater than 150 GPa, and also gives the optical recording medium a sufficient pencil hardness, such as at least H, or more preferably 2H. The optimum thickness of the layer of material should be determined in each case in accordance with the procedure set forth with respect to the first embodiment. Using such a material assures that in the event of a collision of an objective lens with the surface of the optical recording medium, a scratch will not result on the optical recording medium and the optical recording medium will not crack. Additionally, if SiN is used, the value of the coefficient of friction of the first layer is ≦0.3. Thus, any collision between the optical pickup and the optical recording medium will result in less scratches, less wear, less damage to either the optical recording medium or the objective lens, and information reproduction will continue. Examples of other materials similar to SiN which may be used include $SiO_2$ and SiC.

In another alternative embodiment, in order to prevent dust from being attracted to the optical recording medium, it is beneficial to form the light transmissive layer of a material with an anti-static effect, and thus to form the first layer of a conductive material. In this embodiment, if this first layer is formed, by way of example, of indium, tin oxide, compounds thereof or an amorphous carbon having a thickness of approximately 50 nm, the hardness of the surface of the light transmissive layer can be improved, and the resistivity thereof can be set to approximately $10^9 \Omega$/unit square of sheet resistivity.

The material forming this first layer can also be formed of an organic resin such as acrylurethane system ultraviolet curing resin by spin coating to have a thickness of from 0.1 to 10 μm to insure even thickness of the resin in a further alternative embodiment of the invention. However, if the first layer is formed of an organic resin, the wetability between the organic resin materials formed in the first and second layers must be considered. As is disclosed in Japanese laid-open patent publication No. H6-52576, it is desirable to employ a material having a lower surface tension as compared with a critical surface tension of the second layer. A material manufactured by Dainippon Ink & Chemicals Inc. under the tradename of SD301 can be used as the material for the second layer.

In this embodiment, in order to further consider the problem of static electricity, if powders of an oxide of metals of at least one kind of indium, tin or zinc are mixed in the above organic resin, the resistance value of the surface of the light transmissive layer can be lowered, and the antistatic effect can be improved. For example, the resistance value of a conventional magneto-optical disc at its surface is approximately $10^{16} \Omega$/unit square of sheet resistivity. If the materials described above, including the noted powders, are used, the resistance value at the surface of the light transmissive layer can be reduced to approximately $10^{12}$–$10^{13} \Omega$/unit square of sheet resistivity which provides a sufficient antistatic effect.

When the second layer of the light transmissive layer is formed of ultraviolet curing resin, and the first layer is formed of an organic resin, it is preferable to adjust the water absorption ratios of the layers in response to the applications thereof. Since the second layer of the optical recording medium should prevent corrosion of the reflective recording layer, it is preferable that a material having a relatively low water absorption ratio be used. Furthermore, since the first, surface layer of the light transmissive layer should have improved hardness and an antistatic effect, a material having a higher water absorption may be employed so that an ion effect is provided to further reduce the conductivity thereof.

Finally, a silicon lubricant manufactured by Shin-Etsu Chemical Co., Ltd. under the tradename KF-96, or other silicon-based lubricant may be used to form the first layer to reduce the friction between the objective lens and the light transmissive layer and may be applied by spin coating to a thickness of 100 nm, thereby reducing any scratching of or damage to the lens or the optical recording medium upon contact therebetween. This silicon lubricant is also beneficial in that if a user wipes the surface of the optical recording medium to remove dust or the like therefrom, the coefficient of friction between the wiping mechanism and the optical recording medium will be reduced, thereby further reducing any scratches on the surface thereof.

It will thus be seen that the objects set forth above, among those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention hereindescribed and all statements of the scope of the invention which, as a matter of language, might be said to fall therebetween.

What is claimed:

1. An optical recording medium, comprising:
   an optical recording medium, a substrate having a surface for recording information as pits and grooves;

a recording layer formed adjacent said surface of said substrate; and a light transmissive layer formed adjacent said recording layer;

wherein information is recorded and/or reproduced by irradiation of light from an optical pickup employing an objective lens having a numerical aperture of 0.7 or larger through said light transmissive layer, and wherein at least a surface of said light transmissive layer is formed of a material having a Young's modulus of 70 GPa or greater; and wherein said surface of said light transmissive layer is formed of a material containing at least one of $C_{100-x}H_x$ (1 (atom %)<X<45 (atom %)), $Si_3N_4$, $MgF_2$, $Al_2O_3$, and $SiO_2$.

2. An optical recording medium, comprising:

a base substrate having at least one surface which is irradiated by a laser light for recording and retrieving information to and from said optical recording medium;

an information indicating unit formed on said at least one surface of said base substrate;

a light transmissive layer formed adjacent said information indicating unit, said light transmissive layer having a thickness of from 3 to 177 µm, and wherein said light transmissive layer is formed with a surface to provide a pencil hardness of the disc of at least H;

wherein said light transmissive layer includes two layers, a first of which forms said surface of said light transmissive layer and a second of which is provided adjacent said at least one surface of said base substrate; and wherein said first layer is formed of an inorganic material.

3. The optical recording medium of claim 2, wherein said first layer is formed of material selected from the group consisting of SiN, SiC or SiO.

4. The optical recording medium of claim 2, wherein said light transmissive layer is formed of an organic resin layer.

5. The optical recording medium of claim 4, wherein said first layer is formed by spin coating and has a thickness of from between 0.1 and 10 µm.

6. The optical recording medium of claim 2, wherein said first layer is formed of an organic resin layer having powders selected from the group consisting of oxides of metals of In, Sn and Zn mixed therein.

7. The optical recording medium of claim 2, wherein said first layer has a surface tension having a smaller value as compared with a critical surface tension of said second layer.

8. The optical recording medium of claim 2, wherein said first layer is formed of a silicon lubricant.

9. The optical recording medium of claim 2, wherein a surface resistance of said surface of said light transmissive layer is no greater than $10^{13}\Omega$/unit square of sheet resistivity.

10. An optical recording medium, comprising:

a base substrate having at least one surface which is irradiated by a laser light for recording and retrieving information to and from said optical recording medium;

an information indicating unit formed on said at least one surface of said base substrate;

a light transmissive layer formed adjacent said information indicating unit, said light transmissive layer having a thickness of from 3 to 177 µm, and wherein said light transmissive layer is formed with a surface to provide a pencil hardness of the disc of at least H;

wherein said light transmissive layer includes two layers, a first of which forms said surface of said light transmissive layer and a second of which is provided adjacent said at least one surface of said base substrate; and wherein said first layer is formed by sputtering and has a thickness of from between 1 and 200 nm.

11. An optical recording medium, comprising:

a base substrate having at least one surface which is irradiated by a laser light for recording and retrieving information to and from said optical recording medium;

an information indicating unit formed on said at least one surface of said base substrate;

a light transmissive layer formed adjacent said information indicating unit, said light transmissive layer having a thickness of from 3 to 177 µm, and wherein said light transmissive layer is formed with a surface to provide a pencil hardness of the disc of at least H;

wherein said light transmissive layer includes two layers, a first of which forms said surface of said light transmissive layer and a second of which is provided adjacent said at least one surface of said base substrate; and wherein said first layer has a conductivity sufficient to reduce static charge retained thereon.

12. The optical recording medium of claim 11, wherein said first layer is formed of a conductive inorganic material.

13. The optical recording medium of claim 11, wherein said first layer is formed of material selected from the group consisting of indium oxide, tin oxide and compounds thereof.

14. A method for recording and retrieving information from a recording medium, said recording medium being formed of a substrate having a surface for recording information as pits and grooves, a recording layer formed adjacent said substrate, and a light transmissive layer formed adjacent said recording layer, a surface of said light transmissive layer having a Young's modulus of 70 GP or greater, comprising the steps of:

irradiating said recording medium by a laser light from an optical pickup employing an objective lens having a numerical aperture of 0.7 or larger; and recording and/or reproducing information to and/or from said recording medium in accordance with said laser light.

* * * * *